US006941860B2

(12) United States Patent
Van Der Beek et al.

(10) Patent No.: US 6,941,860 B2
(45) **Date of Patent: *Sep. 13, 2005**

(54) METHOD OF BRIQUETTING METAL CHIPS AND BRIQUETTING PRESS

(75) Inventors: August Van Der Beek, Grevenbroich (DE); Michael Schaaf, Solingen (DE); Walter Fischer, Neuss (DE); Harald Pechtel, Neuss (DE)

(73) Assignee: Metso Lindemann GmbH, Dusseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/658,237

(22) Filed: Sep. 9, 2003

(65) Prior Publication Data

US 2004/0045453 A1 Mar. 11, 2004

Related U.S. Application Data

(63) Continuation of application No. 09/957,240, filed as application No. PCT/DE00/01115 on Apr. 12, 2000, now Pat. No. 6,782,595.

(30) Foreign Application Priority Data

Apr. 12, 1999 (DE) .......................................... 199 17 421

(51) Int. Cl.[7] .......................... B30B 15/30; B23Q 17/00

(52) U.S. Cl. ............................ 100/35; 100/45; 100/48; 100/50; 100/52; 100/906; 29/238; 29/403.2; 29/407.1; 29/407.05

(58) Field of Search ............................. 100/41, 42, 45, 100/48, 50, 52, 215, 217, 218, 229 R, 249, 257, 906; 425/135, 140, 141, 145, 149, 150; 264/40.1, 40.4, 40.5; 29/238, 403.2, 407.1, 705, 407.09, 407.05, 403.1, 720

(56) References Cited

U.S. PATENT DOCUMENTS

| | | | | | |
|---|---|---|---|---|---|
| 737,425 | A | * | 8/1903 | Laemoes et al. | 100/218 |
| 737,427 | A | * | 8/1903 | Lemberg | 100/208 |
| 752,565 | A | * | 2/1904 | Koneman | 425/107 |
| 843,565 | A | * | 2/1907 | Misner | 425/205 |
| 896,427 | A | * | 8/1908 | Abbott | 425/382 R |
| 952,960 | A | * | 3/1910 | Fernholtz | 425/376.1 |
| 1,054,464 | A | * | 2/1913 | Soucek | 425/378.1 |
| 1,057,029 | A | * | 3/1913 | Bartlett | 425/422 |
| 1,183,760 | A | * | 5/1916 | Parker | 264/603 |
| 1,463,094 | A | * | 7/1923 | Rigby | 425/376.1 |
| 1,473,389 | A | * | 11/1923 | Smith et al. | 100/215 |
| 1,819,740 | A | * | 8/1931 | Davis | 425/449 |
| 1,860,075 | A | * | 5/1932 | Byerlein et al. | 100/193 |
| 2,110,972 | A | * | 3/1938 | Dinzl | 425/78 |
| 2,128,241 | A | * | 8/1938 | Goss | 425/345 |

(Continued)

FOREIGN PATENT DOCUMENTS

| | | |
|---|---|---|
| DE | 19533903 | 3/1997 |
| EP | 0 367 859 | 5/1990 |
| EP | 0 490 148 | 6/1992 |

*Primary Examiner*—Lowell A. Larson
*Assistant Examiner*—Jimmy Nguyen
(74) *Attorney, Agent, or Firm*—Norris, McLaughlin & Marcus, P.A.; Christa Hildebrand

(57) ABSTRACT

A method and a briquetting press for briquetting metal chips, wherein stable briquettes/pressed component are produced. The actual length ($L_{act}$) of the pressed component is obtained by applying pressure ($P_{max}/P_{req}$) using at least one pressing ram (1, 2) and measuring the length with a measuring device (5, 6). The measured value is compared to a desired nominal value ($L_{nom}$) and a difference value (□) is subsequently determined.

8 Claims, 2 Drawing Sheets

U.S. PATENT DOCUMENTS 2,206,000 A * 6/1940 Byerlein ..................... 100/353
2,311,940 A * 2/1943 Grob .......................... 100/353
2,332,170 A * 10/1943 Sapp .......................... 425/311
2,359,674 A * 10/1944 Pollock ...................... 425/420
2,360,487 A * 10/1944 Fullerton .................... 100/143
2,384,163 A * 9/1945 Flowers ...................... 425/149
2,507,491 A * 5/1950 Crea .......................... 425/182
2,537,920 A * 1/1951 Smith ......................... 425/556
2,780,987 A * 2/1957 Wall ........................... 100/35
2,817,891 A * 12/1957 Zweigle ...................... 425/204
2,968,842 A * 1/1961 Roche ........................ 100/209
2,984,172 A * 5/1961 Roberts et al. ............... 100/90
3,388,374 A * 6/1968 Tezuka ....................... 100/215
3,564,993 A * 2/1971 Kunitoshi ................... 100/215
3,810,421 A * 5/1974 Mosley ........................ 100/95
3,824,054 A * 7/1974 Harris ........................ 425/149
3,838,634 A * 10/1974 Alexandrov et al. .......... 100/50
3,901,635 A * 8/1975 Greenberger ............... 425/145
3,980,014 A * 9/1976 McEwen et al. ............ 100/127
4,123,209 A * 10/1978 Moore ......................... 425/74
4,275,650 A * 6/1981 Telling ........................ 100/45
4,333,394 A * 6/1982 Brown ........................ 100/42
4,483,246 A * 11/1984 Sullivan et al. ............... 100/35
4,559,004 A * 12/1985 Augier ....................... 425/261
4,601,238 A * 7/1986 Davis et al. .................. 100/45
4,669,375 A * 6/1987 Newsom et al. ............. 100/45
4,700,622 A * 10/1987 Satake ........................ 100/45
4,750,417 A * 6/1988 Newsom et al. .............. 100/35
4,787,308 A * 11/1988 Newsom et al. .............. 100/50
5,059,372 A * 10/1991 Klais .......................... 264/120
5,083,509 A * 1/1992 Hansen et al. ................ 100/73
5,088,399 A * 2/1992 Cacace et al. .............. 100/218
5,145,692 A * 9/1992 Hereford .................... 425/139
5,318,426 A * 6/1994 Hanson et al. ................ 425/64
5,326,511 A * 7/1994 Cooper et al. ............. 264/40.1
5,494,626 A * 2/1996 Middleton .................. 264/115
5,503,788 A * 4/1996 Lazareck et al. ........... 264/115
5,507,988 A * 4/1996 Eagan et al. ................ 264/122
5,542,348 A * 8/1996 Bendzick ..................... 100/37
5,582,846 A * 12/1996 Cooper et al. .............. 425/140
5,629,033 A * 5/1997 Lienau ....................... 425/353
5,664,492 A * 9/1997 Bendzick ..................... 100/45
6,272,981 B1 * 8/2001 Murata et al. ................ 100/50
6,349,638 B1 * 2/2002 Thompson .................. 100/218

* cited by examiner

METHOD OF BRIQUETTING METAL CHIPS AND BRIQUETTING PRESS

RELATED APPLICATION

This application is a continuation of U.S. application Ser. No. 09/959,240, filed on Feb. 20, 2002, now U.S. Pat. No. 6,782,595, which is a national stage of International application PCT/DE00/01115, filed on Apr. 12, 2000, and which claims priority of German Application 199 17 421.0, filed on Apr. 12, 1999.

BACKGROUND OF THE INVENTION

1. Field of the Invention

The invention relates to a method for briquetting metal chips and a briquetting press for carrying out the method.

2. Description of the Related Art

DEA-40 39 788 discloses briquetting presses that have at least one pressing ram disposed in a pressing sleeve to press metal chips in the form of briquettes. A stamper is used to feed the metal chips to a metering device disposed radially in relation to the pressing sleeve. The process flow is as follows:

- advancing the stamper, filling and closing the pressing sleeve,
- advancing the pressing ram and feeding the metal chips into the pressing section of the pressing sleeve,
- applying pressure to the metal chips with at least one pressing ram until a final pressure $P_{max}$ or a required pressure $P_{req}$ is attained,
- optionally, retracting a second pressing ram and expelling the completed pressed article as a briquette using the first pressing ram, and
- retracting the first pressing ram and, optionally, advancing the second pressing ram into the initial position.

The aforedescribed, optionally double-acting, briquetting presses, unlike conventional briquetting presses, produce a pressed article with a particularly high densification approximating the intrinsic density of the metal, and also have a high throughput, thereby optimally achieving both a high density and a high efficiency. In contrast to single-sided presses, significantly longer briquettes can be produced, because the stroke lengths, in order to be manageable, have to stay within practical limits, as determined by the machine tool and the manufacturing environment.

EP-A-0 367 859 also describes a method and a briquetting press for making briquettes having dimensional stability from pressed material in the form of chips, fiber, dust, and lamellar material. The material to be pressed is hereby fed to a precompacting plunger and precompacted in a receiving chamber and thereafter further compacted in a forming box by a press plunger which moves perpendicular to the precompacting plunger. According to this invention, by exactly determining the end position of the press plunger and the precompacting plunger, respectively, variations in the material to be pressed can be almost entirely eliminated, so that the intended power of the press can be utilized with a high efficiency.

However, the results from these technical teachings can not be applied to axially-aligned, double-acting briquetting presses.

U.S. Pat. No. 5,326,511 also teaches a solution similar to that of the previous reference. However, even when taking into account all the features of this type of presses which operate with a precompacting plunger and a press plunger in mutually perpendicularly disposition, the prior art presses do not suggest an obvious solution that can be adapted to pressing rams operating in opposing directions in a pressing sleeve, since this arrangement represents a completely different type of press with an entirely different operating characteristic.

Indeed, a double-acting briquetting press with pressing rams operating in a pressing sleeve cannot easily produce pressed articles in the form of briquettes with a workable and acceptable length and also a small manufacturing tolerance. Disadvantageously, the maximum possible fill volume in the pressing sleeve over the length of the briquette can hence not be fully utilized even if maximum pressing power is applied.

BRIEF SUMMARY OF THE INVENTION

It is an object of the invention to provide a method that provides a greater mass throughput of metal chips to be pressed by utilizing the maximum usable nominal length of the briquette, while maintaining the aforedescribed, generally advantageous functional process flow. This is achieved with an improved metering process of the metal chips which results in a maximum fill volume in the pressing sleeve.

It is also an object to provide a briquetting press with suitable technical means for carrying out the method so as to improve metering of the metal chips.

The invention as a whole is intended to produce dimensionally stable briquettes.

The invention is limited to a type of press with only a single pressing sleeve with an opening for the radially disposed metering device with a stamper, which simultaneously functions as a closing member for the opening in the pressing sleeve, as well as two pressing rams with piston rods guided in this pressing sleeve and a stand, frame or housing adapted to receive these components and associated pressure generators.

According to the invention, a method for briquetting of metal chips in a briquetting press is described. The briquetting is done by applying pressure to an article with two pressing rams, which operate in opposite directions. The rams are disposed in a pressing sleeve into which the metal chips are supplied via a metering device by a stamper, which is arranged in radial disposition on the pressing sleeve. Once the stamper fills the pressing sleeve with metered metal chips, the pressing sleeve is closed. Both pressing rams are advanced and feed the metal chips into the pressing section of the pressing sleeve. Pressure is then applied to the metal chips with both pressing ram until a final pressure $P_{max}$ or a required pressure $P_{req}$ is attained. The pressing rams are then retracted, and the completed pressed article is expelled as a briquette. The rams are returned to their initial position. When the pressure $P_{max}/P_{req}$ is applied by the rams, the attained length ($L_{act}$) of the pressed article is measured with a measurement device, and this value is compared with a nominal value ($L_{nom}$). A difference in the two values is determined ($\Delta$). Further, the quantity/mass of a metal chips to be fed from the metering device is determined from this difference value ($\Delta$) according to the nominal length ($L_{nom}$) of the pressed article and, subsequently, the fill quantity is adjusted in the metering device and the corresponding quantity/mass is supplied by the stamper. The process steps of the process flow loop may be repeated again, and pressure may be applied to the metal chips collectively with the pressing rams until the final pressure $P_{max}$ and/or the required pressure $P_{req}$ is attained so as to thereby obtain the nominal value ($L_{nom}$) of the length of the briquettes. It is also contemplated to use an integrated measurement device for determining and/or adjusting the lengths of the briquettes ($L_{act}$ and $L_{nom}$, respectively). The measurement device may be integrated on a piston rod of the pressing ram. An electronic logic module is used for determining the length of the briquettes from the relative position of the pressing ram (1, 2) with the integrated measurement device (5, 6) according to the relationship ($L_{nom/act}=S_1-S_2$). The use of an electronic logic module activates in the metering device a command to increase the metered amount, if it is determined that the actual length $L_{act}$ of the briquettes is smaller than the nominal value $L_{nom}$. It is also possible to activate a command to decrease the metered amount, if it is determined that the actual length $L_{act}$ of the briquettes is greater than the nominal value $L_{nom}$. Further, it is contemplated that the electronic control circuit includes actuators for setting the process data required by the present process, such as the metered quantity, density of the pressed article, length of the pressed article and pressing power. Accordingly, a briquetting press for carrying out the method includes components that carry out the functional operations of the machine, such as a pressing sleeve with an opening for the radially disposed metering device with a stamper which operates also as a closing member for the opening in the pressing sleeve, two pressing rams with piston rods guided in the pressing sleeve, and a stand, frame or housing receiving these components as well as associated pressure generators. Each of the piston rods of the pressing rams is provided with a measurement device. A control circuit for affecting metering of the metal chips as a function of the briquette lengths ($L_{nom}/L_{act}$), as determined by the measurement device, is provided between the measurement device and the metering device, and the control circuit includes actuators and a logic module for controlling the process flow according to the relationship between the briquette length and the metered quantity/mass.

BRIEF DESCRIPTION OF THE DRAWINGS

The drawings show in

DETAILED DESCRIPTION OF THE INVENTION

Figure 1:
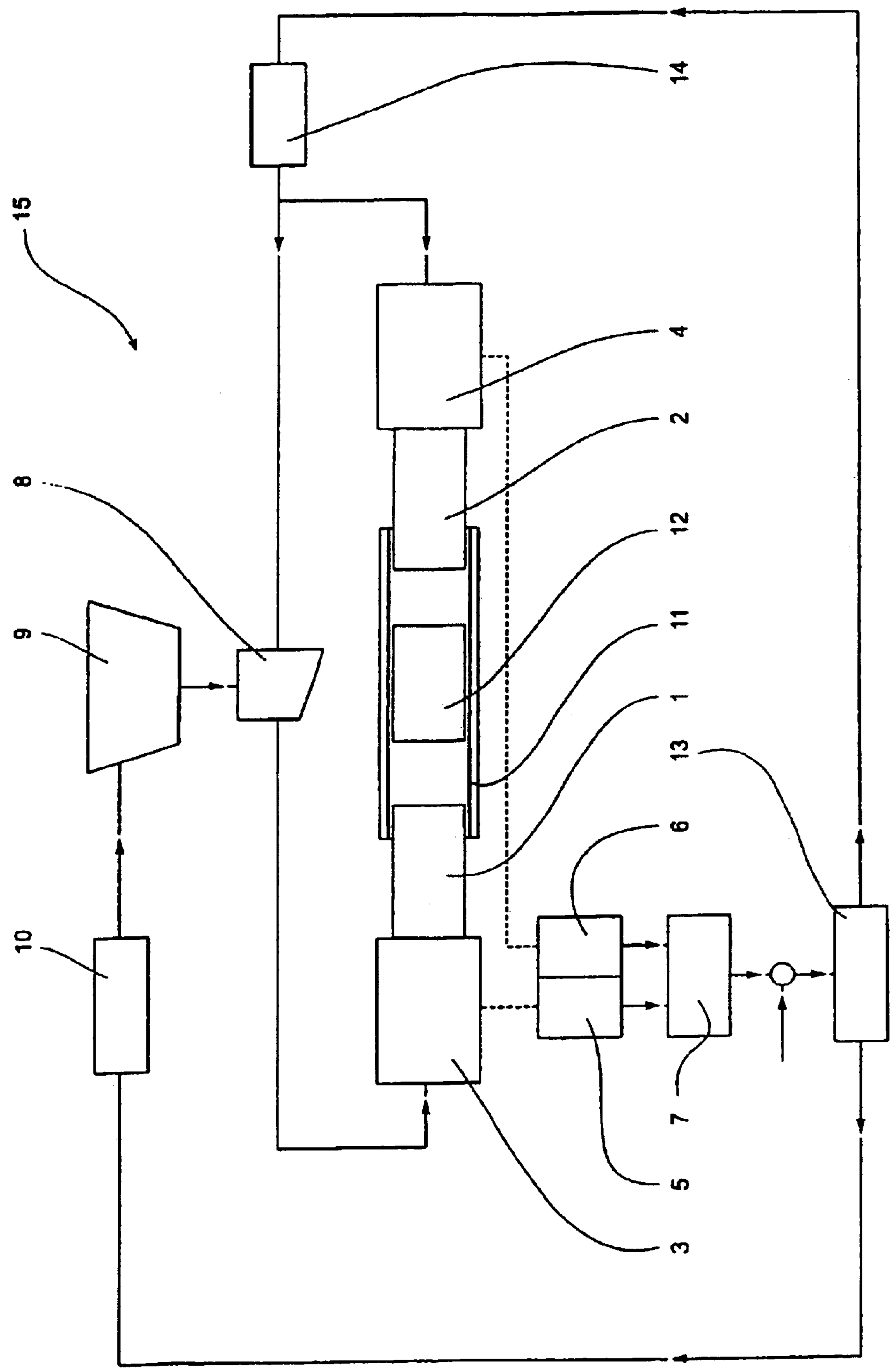
FIG. 1 the principle of the invention, depicted in a schematic diagram of a double-acting briquetting press with control circuit, and FIG. 2 a schematic diagram of the control circuit of FIG. 1.

FIG. 1 shows schematically an embodiment of a double-acting briquetting press with two pressing rams 1, 2, piston rods 3, 4, and measurement devices 5, 6. However, the invention can also be applied to single-acting briquetting presses with a single pressing ram, a single piston rod and a single measurement device. Arranged before the briquetting press is a metering device 9 with a stamper 8 which supplies the metal chips to a pressing sleeve 11 in which the pressed article is formed as a briquette through cooperation of the pressing rams 1, 2.

A control circuit 15 associated with the briquetting press includes the measurement devices 5, 6, a logic module 7, a controller 13 and actuators 10, 14.

Figure 2:
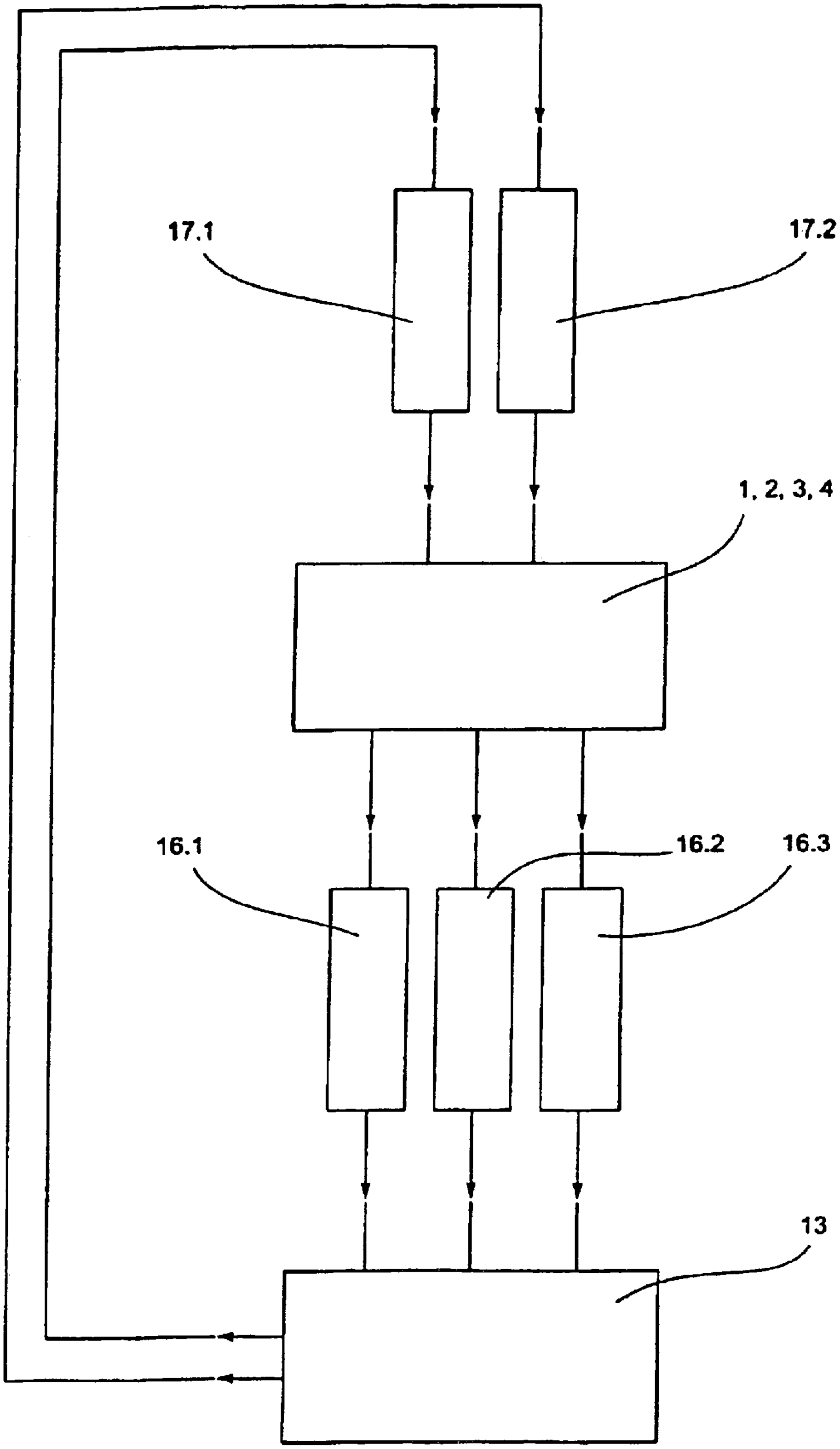

According to FIG. 2, the following schematically depicted functions are controlled: density of the pressed article 16.1, length of the pressed article 16.2, pressing power 16.3 and feed amount 17.1 as well as pressing power 17.2.

The pressed article 12 is produced by applying pressure in the pressing sleeve 11 with the pressing rams 1, 2 according to the following process flow:

(a) advancing stamper 8, filling the pressing sleeve 11 with metal chips via a radially disposed metering device 9, and closing the pressing sleeve 11, (b) advancing the pressing rams 1, 2, and feeding the metal chips into the pressing section of the pressing sleeve, (c) applying pressure to the metal chips with the combination of pressing rams 1, 2 until an end pressure $P_{max}$ and/or a required pressure $P_{req}$ is reached (d) retracting the pressing rams 1, 2 and expelling the finished pressed article.

According to the invention, during the application of pressure $P_{max}/P_{req}$ with the pressing rams 1, 2, the actually attained length of the pressed article $L_{act}$ is measured with the measurement devices 5, 6, this measured value is compared with a nominal value $L_{nom}$, whereafter a difference value Δ is determined. The quantity and/or mass of the metal chips that the metering device 9 has to supply is determined by the desired nominal length $L_{nom}$ of the pressed article 12. Thereafter, the filling amount is adjusted in the metering device 9 and the corresponding amount and/or mass is supplied by the stamper 8. This process flow can be repeated until the final pressure $P_{max}$ and/or the required pressure $P_{req}$ is achieved and the briquette and/or the pressed article 12 has attained its nominal length $L_{nom}$.

An electronic logic module 7 is used to determine with the integrated measurement device 5, 6 the length of the briquette from the relative position of the pressing rams 1, 2. The logic module 7 activates, according to the relationship $L_{nom}=S_1-S_2$, (a) a command to increase the metered quantity, if it is determined that the actual length $L_{act}$ is below the nominal value $L_{nom}$, or (b) a command to decrease the metered quantity, if it is determined that the actual length $L_{act}$ is greater than the nominal value $L_{nom}$.

What is claimed is:

1. A method for briquetting metal chips in a briquetting press by pressurization of a pressed article by at least one press ram in a pressing sleeve, into which metal chips are fed via a metering device assigned radially to the pressing sleeve using a stamper, comprising the steps of (a) advancing the stamper for filling the pressing sleve with the metal chips and closing the pressing sleeve;

(b) advancing the pressing ram and feeding the metal chips into the press section of the pressing sleeve;

(c) pressurizing the metal chips by the at least one press ram until a final pressure $P_{max}$ or required pressure $P_{req}$ is reached and a pressed article is formed;

(d) retracting the at least one press ram and ejecting the pressed article as a briquette and retracting the press ram into a starting position;

wherein during the application of pressure (P.sub.max or P.sub.req) with the press ram, an actual attained length of the pressed article (L.sub.actual) is measured and the measured actual attained length of the pressed article is compared to a nominal length (L.sub.nominal) of the pressed article to determine a difference value (.DELTA.) between the actual attained length (L.sub.actual) and the nominal length (L.sub.nominal), and a quantity or mass of the metal chips that the metering device has to supply is determined from the difference value (.DELTA.) according to the nominal length (L.sub.nominal) of the pressed article, followed by adjusting a filling mass of the metal chips in the metering device and supplying the corresponding quantity or mass of the metal chips by the stamper.

2. The method as claimed in claim 1, wherein the nominal value ($L_{nominal}$) of the length of the briquette is reached during pressurization of the metal chips by the press ram until the final pressure a $P_{max}$ or required pressure $P_{req}$ is reached.

3. The method as claimed in claim 1, further comprising using an integrated measuring device for determining and/or adjusting the actual or nominal briquette length ($L_{actual}$ or $L_{nominal}$).

4. The method as claimed in claim 3, wherein the measuring device is integrated in a piston rod of the pressing ram.

5. The method as claimed in claim 3, further comprising the step of utilizing an electronic logic module for determining the briquette length from the relative positioning of the pressing ram with the integrated measuring device, according to the equation ($L_{nominal/actual}=S_1-S_2$).

6. The method as claimed in claim 5, wherein in the electronic logic module which, according to the equation $L_{nominal}=S_1-S_2$ which (a) according to the observation that the briquette length $L_{actual}$ is under the nominal value $L_{nominal}$, the electronic logic module triggers a command for increased metering, or (b) according to the observation that the briquette length $L_{actual}$ is above the nominal value $L_{nominal}$, the electronic logic module triggers a command for reduced metering of metal chips in the metering device (9).

7. The method as claimed in claim 6, further comprising the step of utilizing an electronic regulator circuit with actuators for adjusting at least one of the processing data of metering quantity, density of the pressed article, length of the pressed article and pressing powers.

8. A briquetting press for briquetting metal chips by pressurization of a pressed article by at least one press ram in a pressing sleeve, into which metal chips are fed via a metering device assigned radially to the pressing sleeve using a stamper, the briquetting press comprising a pressing sleeve including an opening for radially receiving the metering device including a stamper, which closes the opening in the pressing sleeve, two press rams guided in the pressing sleeve each having a piston rod (3, 4), wherein (a) the piston rods of the press rams each of the piston rods accommodates a measuring device, (b) a control circuit positioned between the measuring device and the metering device is provided for influencing the metering of metal chips depending on the briquette lengths ($L_{nominal/actual}$) recorded by the measuring device; and (c) the control circuit includes actuators and a logic module for controlling the processing sequence of briquette length and metering quantity or mass.

* * * * *